United States Patent
Straw

(10) Patent No.: US 9,499,112 B1
(45) Date of Patent: Nov. 22, 2016

(54) PROTECTIVE PANELS FOR A VEHICLE AND METHOD OF MANUFACTURE

(71) Applicant: Anthony M Straw, San Antonio, TX (US)

(72) Inventor: Anthony M Straw, San Antonio, TX (US)

(*) Notice: Subject to any disclaimer, the term of this patent is extended or adjusted under 35 U.S.C. 154(b) by 0 days.

(21) Appl. No.: 14/173,566

(22) Filed: Feb. 5, 2014

Related U.S. Application Data

(60) Provisional application No. 61/761,612, filed on Feb. 6, 2013.

(51) Int. Cl.
*B60R 19/42* (2006.01)
*B05D 1/02* (2006.01)

(52) U.S. Cl.
CPC ................ *B60R 19/42* (2013.01); *B05D 1/02* (2013.01)

(58) Field of Classification Search
CPC ...................................................... B60R 19/42
USPC ................ 296/39.1, 39.2; 293/126, 127, 128
See application file for complete search history.

(56) References Cited

U.S. PATENT DOCUMENTS

| | | | |
|---|---|---|---|
| 3,610,684 A | 10/1971 | Richter | |
| 4,294,478 A | 10/1981 | Marquette | |
| 4,369,225 A | 1/1983 | Manabe et al. | |
| 4,635,996 A * | 1/1987 | Hirose | 296/136.07 |
| 4,643,471 A | 2/1987 | Fishback | |
| 4,707,009 A | 11/1987 | Barnett | |
| 4,810,015 A | 3/1989 | McNeil | |
| 4,828,303 A | 5/1989 | Soria | |
| 4,969,674 A | 11/1990 | Wagner | |
| 4,974,892 A | 12/1990 | Huard | |
| 4,997,229 A | 3/1991 | Swanson | |
| 5,037,148 A | 8/1991 | Kennedy | |
| 5,050,925 A * | 9/1991 | Brown | 296/136.03 |
| 5,072,979 A | 12/1991 | Swinton | |
| 5,112,092 A | 5/1992 | Pucci | |
| 5,158,324 A * | 10/1992 | Flesher | 280/770 |
| 5,184,857 A | 2/1993 | Hawkins | |
| 5,188,407 A * | 2/1993 | Villaveces et al. | 293/128 |
| 5,280,989 A | 1/1994 | Castillo | |
| 5,312,145 A * | 5/1994 | McNeil | 293/128 |
| 5,320,392 A | 6/1994 | Hart | |
| 5,421,625 A | 6/1995 | Arko | |
| 5,480,688 A * | 1/1996 | Kaumeyer | 428/13 |
| 5,571,581 A * | 11/1996 | Koizumi et al. | 428/31 |
| 5,931,522 A * | 8/1999 | Roskey | 296/136.07 |
| 5,975,599 A | 11/1999 | Goldstein | |
| 5,984,401 A * | 11/1999 | Hannah | 296/136.01 |
| 6,062,617 A | 5/2000 | Marks | |
| 6,179,354 B1 | 1/2001 | Bennett, Jr. | |
| 6,183,580 B1 | 2/2001 | Harrell et al. | |
| 6,296,279 B1 | 10/2001 | Stoddard et al. | |
| 6,457,755 B1 | 10/2002 | Nieto | |
| 6,481,782 B2 | 11/2002 | Bond | |
| 6,719,339 B1 * | 4/2004 | Yoham | 293/128 |
| 6,926,339 B2 | 8/2005 | Gentile | |
| 7,077,440 B1 | 7/2006 | Morales | |
| 7,090,266 B1 | 8/2006 | Price | |

(Continued)

*Primary Examiner* — Jason S Morrow

(57) ABSTRACT

A method of manufacturing one or more protective panel for a vehicle that comprises affixing plastic sheeting to a vehicle surface; magnetically coupling at least one magnet strip over the plastic to the surface; spraying a heated mixture of thermoplastic polyurethane and polyurea on the sheeting over the at least one magnet; drying the mixture into a body; cutting at least one panel from the body. The panels are cut according the shape of the surface area to protect, after which the plastic is removed from the cut panel shapes.

3 Claims, 3 Drawing Sheets

(56) References Cited

U.S. PATENT DOCUMENTS

| | | | |
|---|---|---|---|
| 7,229,108 B2 | 6/2007 | Hochrein | |
| 7,374,214 B2 | 5/2008 | Debs | |
| 7,520,553 B1* | 4/2009 | Schouest et al. | 296/39.1 |
| 7,527,320 B1* | 5/2009 | Nevell, Jr. | 293/102 |
| 7,677,638 B1 | 3/2010 | Kerr | |
| 7,828,363 B1 | 11/2010 | Henry | |
| 8,109,557 B1 | 2/2012 | Salinas | |
| 8,162,383 B2 | 4/2012 | Curtis | |
| 8,303,005 B1 | 11/2012 | Hill | |
| 8,702,136 B2* | 4/2014 | Azhagesan | 293/128 |
| 2002/0105197 A1 | 8/2002 | Unterwagner | |
| 2002/0145293 A1 | 10/2002 | Bond | |
| 2003/0062732 A1 | 4/2003 | Molina | |
| 2003/0146630 A1 | 8/2003 | Ko | |
| 2003/0150566 A1 | 8/2003 | Ciano | |
| 2006/0097528 A1 | 5/2006 | Southerland et al. | |
| 2006/0198977 A1* | 9/2006 | Meservey | 428/40.1 |
| 2007/0108780 A1 | 5/2007 | Udolph | |
| 2007/0166101 A1 | 7/2007 | Scheu | |
| 2007/0273167 A1* | 11/2007 | Alexander et al. | 293/126 |
| 2010/0007169 A1 | 1/2010 | Nguyen | |
| 2010/0109308 A1 | 5/2010 | Gordon | |
| 2010/0140966 A1 | 6/2010 | Kimball | |
| 2011/0297713 A1* | 12/2011 | Gisin | B60R 9/04 224/327 |
| 2012/0223513 A1 | 9/2012 | King, IV | |
| 2012/0242102 A1 | 9/2012 | Akers | |

* cited by examiner

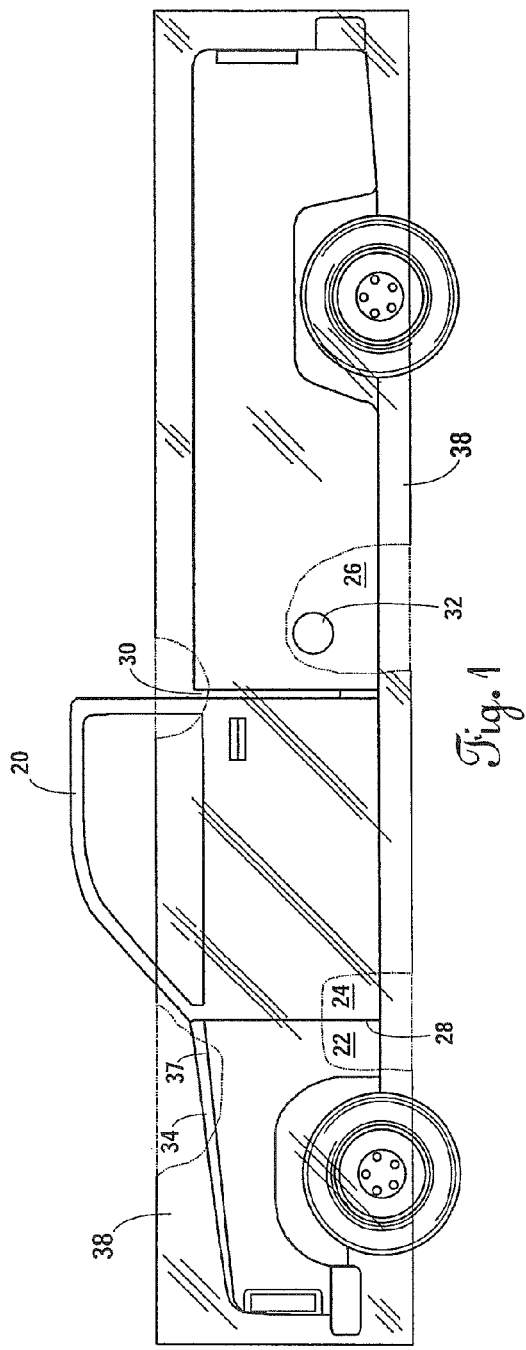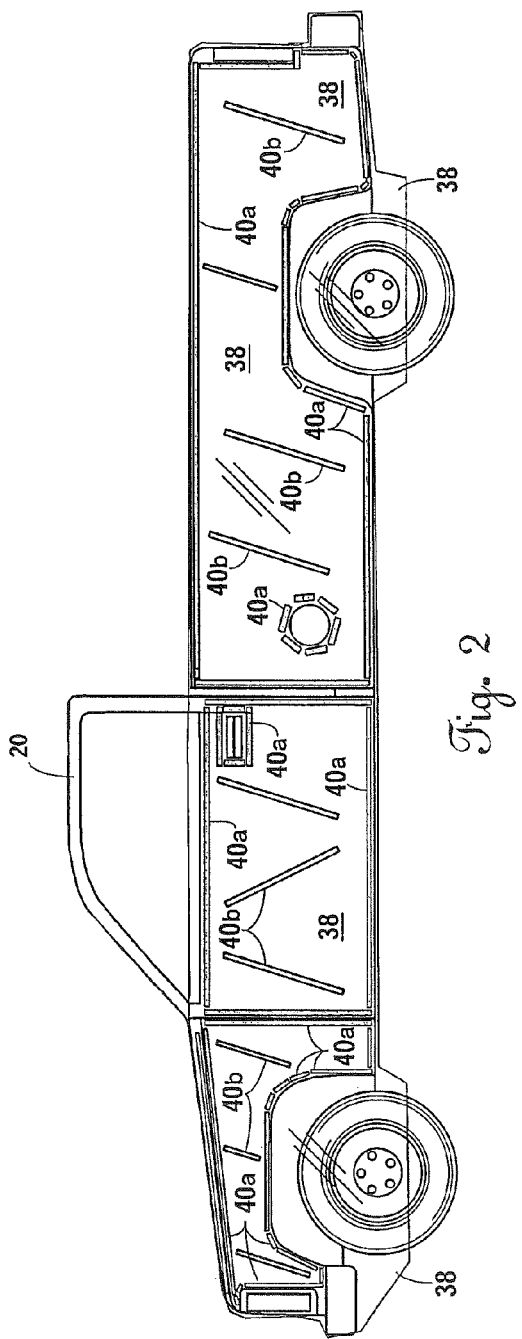

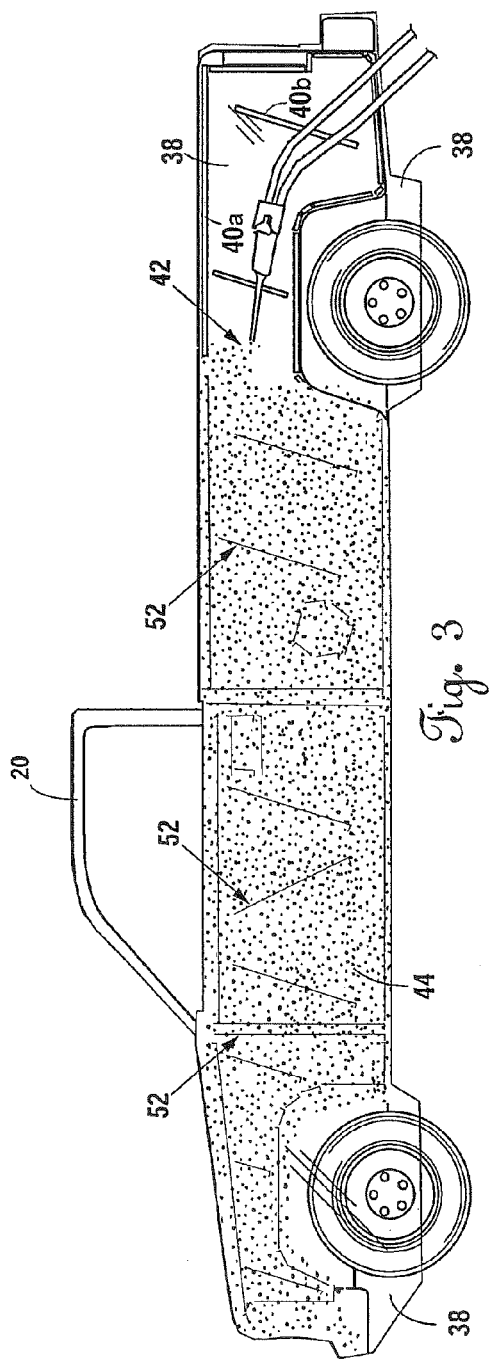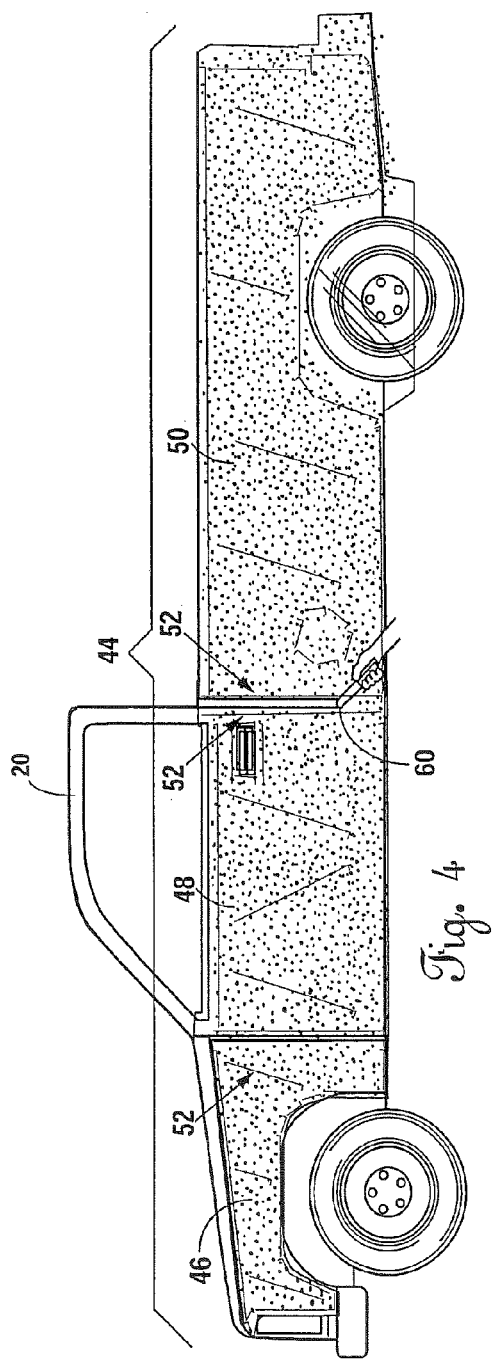

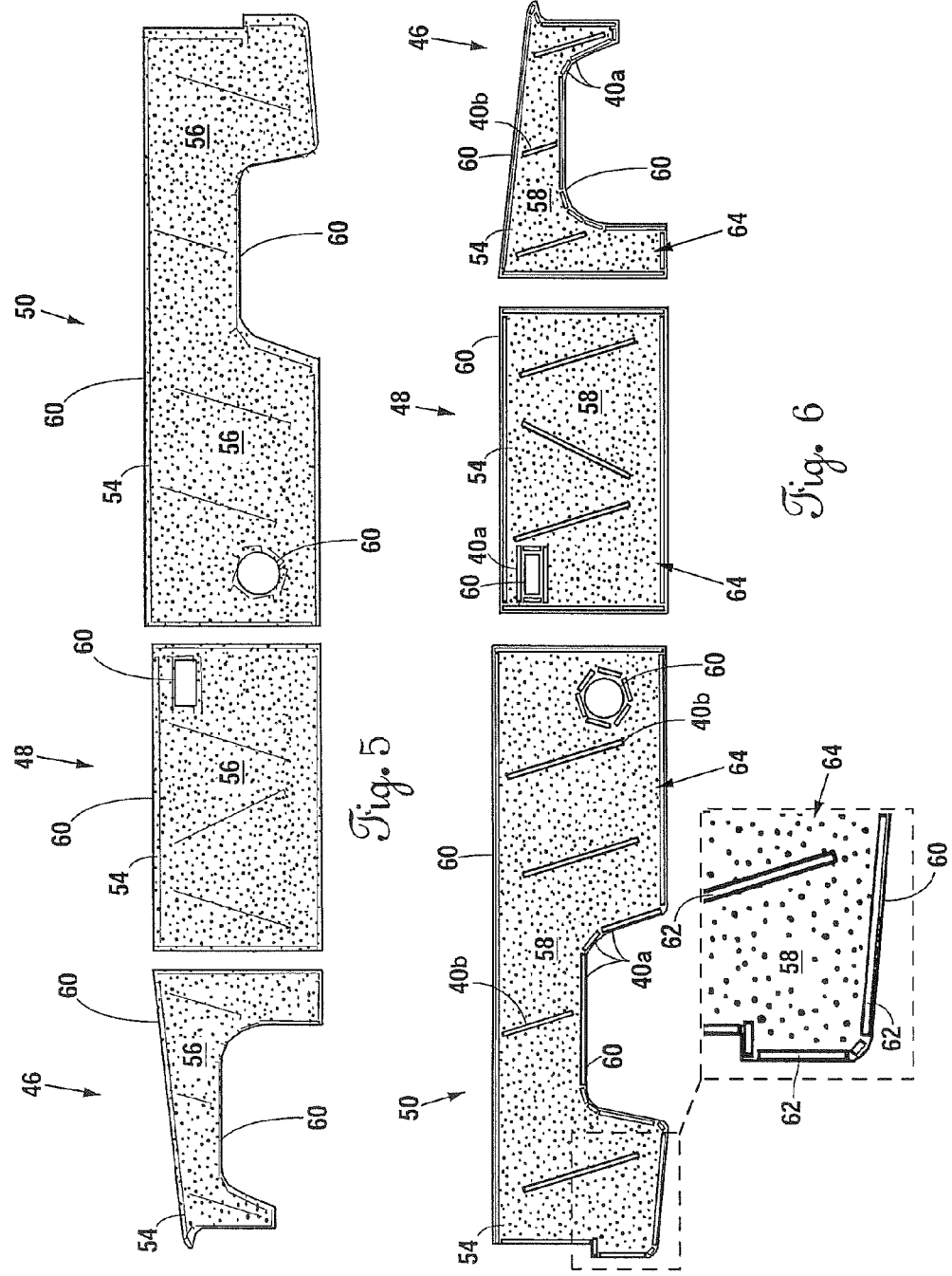

PROTECTIVE PANELS FOR A VEHICLE AND METHOD OF MANUFACTURE

CROSS-REFERENCES TO RELATED APPLICATIONS

This original nonprovisional application claims the benefit of and priority to U.S. provisional application Ser. No. 61/761,612, filed Feb. 6, 2013, which is incorporated by reference.

BACKGROUND

1. Field of the Invention

The present invention relates to vehicle protection. More specifically, the invention comprises one or more protective panels for covering the outer surfaces of a vehicle.

2. Description of the Related Art

Protective panels are widely used to cover various surfaces of vehicles. For example, a company might affix protective panels preprinted with various company information to a fleet of cars it leases for its sales personnel. These panels protect the paint on the surface of a vehicle from scratches, dents, or dings caused from brush, trees, debris, rocks or other hazards encountered while driving on or off a road.

Such protective panels are normally constructed from one or more materials similar to neoprene. The material construction makes these protective panels heavy in weight, and thus the magnetized panels do not attach to the surfaces of vehicles with ease. This is problematic for owners and users of vehicles who need lighter weight panels that are easily used on the surface of a vehicle.

Other construction methods use vinyl sheeting to make these protective panels. Vinyl sheeting is lighter than the heavier neoprene-like materials. However, panels constructed of vinyl sheeting are not form fitting over large areas and do not work well for panels that include significant contours.

Vehicle owners may want to protect surface areas of their vehicles, companies that lease vehicles may want to promote their company or products without painting the vehicles, and others may simply enjoy the combined protection and ability to promote items offered by such protective panels. But the limitations of weight and design of existing panels cause some vehicle users and owners to select other options. For instance, some may prefer to have the surface of the vehicle permanently painted with certain information that would otherwise appear on a protective panel. This is problematic for users and owners of vehicles who need temporary information visible from a vehicle. It is also problematic for those who require additional protection of the vehicle's surface from scratches, dents, and dings that may occur in the normal operation of a business. For instance, a construction company may require temporary placement of magnetized protective panels of particular sub-contractors when those sub-contractors are hired for a particular job.

BRIEF SUMMARY

The present invention provides protective panels for a vehicle and a method of manufacturing such panels. The panels may then be used by a vehicle operator to protect the vehicle from environmental elements, such as the hazards of a construction site, trees and brush that might be found on a ranch or farm, or even hail.

The panel comprises a thermoplastic body with a body outer surface, a body inner surface, and a boundary. At least one magnet is embedded within the body. The panel also has an inner surface formed by the body inner surface and an exposed surface of the magnet. The panel inner surface corresponds to the shape and contour of the vehicle surface to be protected.

The method comprises affixing plastic sheeting to a vehicle surface; magnetically coupling at least one magnet over the plastic to the surface; spraying a heated mixture of thermoplastic polyurethane and polyurea (e.g., a mixture such as that contained in Rhino Linings bedliners, Line-X® bedliners, and/or Armaguard bedliners) on the sheeting over the at least one magnet; drying the mixture into a body; cutting at least one panel from the body, the panel shapes cut according the shape of the surface area to protect; and removing the plastic from the panel.

BRIEF DESCRIPTION OF THE DRAWINGS

FIG. 1 shows a vehicle prior the step of affixing plastic sheeting.

FIG. 2 shows the vehicle of FIG. 1 with plastic sheeting having been applied and magnetic strips applied to areas of the vehicle surface.

FIG. 3 shows the plastic sheeting being sprayed with a mixture of polyurethane and polyurea.

FIG. 4 shows panels being formed after the mixture has dried.

FIG. 5 shows panels separated from the vehicle.

FIG. 6 is a reverse view of the panels shown in FIG. 5.

DETAILED DESCRIPTION

Some embodiments of the invention include a protective panel for covering a surface area of a vehicle. The protective panel of some embodiments is constructed from a material that protects the surface area of the vehicle from hazardous contacts while the vehicle is operating. In some embodiments, the material comprises thermoplastic polyurethane and polyurea. The thermoplastic polyurethane and polyurea of some embodiments is heated and sprayed over vinyl magnetic segments which form protective panels that are form fitting and customizable. In some embodiments, the material construction results in lightweight panels that are easily affixed to and removed from a vehicle surface. In some embodiments, when the protective panels are affixed to the vehicle, a protective barrier is formed between the paint of the vehicle surface and any hazardous contacts encountered while the vehicle is operating.

Through the construction using heated, sprayed on thermoplastic polyurethane and polyurea over vinyl magnetic segments, the panels become form fitting (e.g., can be constructed to fit over a contoured surface of a vehicle) and customizable pieces that are lightweight and removable. Other panels are cumbersome, are not easily affixed to surfaces of vehicles, cannot be adequately or easily stored, and involve difficult construction processes. Panels constructed using heated, sprayed on thermoplastic polyurethane and polyurea over vinyl magnetic segments require less time to construct, are lighter weight, and adhere precisely to the contours of the vehicle for which they are constructed.

Some embodiments provide a method of making protective panels from heated, sprayed-on thermoplastic polyurethane and polyurea over vinyl magnetic segments. In these embodiments, the method includes (1) affixing plastic sheeting to a vehicle surface to cover one or more surface areas of the vehicle. The method includes (2) applying a set of magnetic vinyl strips over plastic to each surface area of the vehicle to be covered. In some embodiments, the magnetic vinyl strips have length and width dimensions. In some embodiments, the width of the magnetic vinyl strips is one inch and the length is any of several different lengths. The method of some embodiments includes (3) applying heated thermoplastic polyurethane and polyurea to areas of the vehicle having magnets in place. In some embodiments, the method applies the thermoplastic polyurethane and polyurea by a spray-on procedure that causes the thermoplastic polyurethane and polyurea to be mixed. In some embodiments, the thermoplastic polyurethane and polyurea are mixed in approximately equal parts in the resulting mixture. After applying the heated thermoplastic polyurethane and polyurea to the vehicle, the method of some embodiments includes (4) drying the thermoplastic polyurethane and polyurea mixture. Once the thermoplastic polyurethane and polyurea mixture substantially dries into a solid body, the method of some embodiments includes (5) cutting the dried thermoplastic polyurethane and polyurea body based on a particular desired shape. In some embodiments, the method includes (6) removing the plastic from the dried thermoplastic polyurethane and polyurea body. The method can remove the plastic before the dried body is cut, or alternatively, the method can remove the plastic after the dried body is cut.

In some embodiments, the plastic sheet affixed to the vehicle surface provides protection for the vehicle's paint when the heated thermoplastic polyurethane and polyurea is applied. The plastic sheeting prevents the sprayed-on thermoplastic polyurethane and polyurea body from adhering to the vehicle's paint. After removing the plastic, the magnets remain bonded to the thermoplastic polyurethane and polyurea, thereby forming the panels.

In some embodiments, the magnetic vinyl strips are integrated into the panel through the natural adhesion of the spray-on process and enable the panels to be placed onto metal surfaces of a vehicle. In this way, the panels can be placed on a vehicle and removed as needed (e.g., when the panels are not in use or when the vehicle surface is ready for cleaning).

In some embodiments, straps can be used to assist in affixing the panels to the vehicle. Other protective material can also be used to add one or more layers of protection for the vehicle's paint from the panels themselves. Panel construction using different spray on materials or injection molding could be employed. In addition, kevlar materials could also provide protective properties against bomb or bullet fragments for military and law enforcement purposes.

FIG. 1 shows a vehicle 20 having various surfaces to be protected with the method of the invention. The surfaces to be protected are the front left panel 22, the left door 24, and the rear left panel 26. The front left panel 22 and left door 24 are separated by a first gap 28. The left door 24 and rear left panel 26 are separated by a second gap 30. The rear left panel 26 includes an opening 32 for access to the fuel tank of the vehicle 20. The vehicle 20 includes a hood 34 separated from the front left panel 36 by a third gap 37.

A strip of plastic sheeting 38 having a length longer than the left side of the vehicle 20 and a height sufficient to cover the surfaces is moved proximal to, and then affixed over, the surfaces 22, 24, 26, and the first and second gaps 28, 30. The sheeting 38 tends to maintain its position through its frictional engagement with the vehicle 20, and may also be attracted to the vehicle 20 as a result of static cling (i.e., the tendency for light objects to cling to other objects as a a result of their opposite electrical charges). The sheeting 38 is first smoothed to minimize the number and size air bubbles between the sheeting 38 and the vehicle 20. The sheeting 38 may also be trimmed to remove excess material that extends past the surfaces to be protected.

Although the method is shown as using a single sheet of plastic sheeting 38, multiple sheets in various sizes may also be used. In such alternative embodiments, a number of smaller sheets may be applied over the surfaces to be protected in an overlapping manner such that areas of the surfaces may be covered by one, two, or even more individual sheets.

As shown in FIG. 2, magnets 40a-b are magnetically coupled to the surfaces 22, 24, 26. The magnets 40a-b are not in direct contact with the vehicle surfaces, but are separated from the surfaces by the plastic sheeting 38. Some of the magnets 40a are coupled proximal to the surface boundaries whereas other magnetics 40b are coupled within the area defined by the boundary magnets.

FIG. 3 shows the sheeting 38 and magnets 40a-b being sprayed with a mixture 42 of thermoplastic polyurethane and polyurea. The mixture 42 is then allowed to dry into a single body 44 covering all three surfaces 22, 24, 26, but separated from the surface by the plastic sheeting 38 and magnets 40a-b. The mixture 42 adheres the magnets 40a-b as it is sprayed on, but leaves exposed the surfaces of the magnets in contact with the sheeting 38. The inner surfaces of the body 44 and the magnets 40a-b correspond the shape and contours of the surfaces 22, 24, 26. The body 44 comprises raised portions 52 that correspond to the position of the magnets.

As shown in FIG. 4, the thermoplastic body 44 may then be cut into panels having shapes corresponding to the respective surfaces. The raised portions 52 may be used as a visual indicator as to where the body 44 should be cut to form the panels. A first panel 46 corresponds in shape and contour to the front left panel 22 of the vehicle 20. A second panel 48 corresponds and shape and contour to the left door 24. A third panel 50 corresponds in shape and contour to the rear left panel 26.

As shown in FIG. 5-6, each panel comprises a body 54 of the dried mixture that has a body outer surface 56, a body inner surface 58, and panel boundaries 60. The magnets 40a-b are embedded in the panel bodies 54, and each magnet 40a-b has an exposed surface 62 that forms part of a panel inner surface 64 that corresponds to the shape and contour of the vehicle surfaces. Each panel 46, 48, 50 may be magnetically coupled to its corresponding surface of the vehicle 20 with the exposed surface 62 of the magnets 40a-b.

The above-described embodiments of the invention are presented for purposes of illustration and not of limitation.

I claim:

1. A method of making protective panels for a vehicle surface, the method comprising:

affixing plastic sheeting to the surface of the vehicle;

magnetically coupling at least one magnet to the surface over the plastic sheeting;

spraying a mixture of thermoplastic polyurethane and polyurea on the plastic spraying over the at least one magnet;

drying the mixture into a body;

cutting at least one panel from the body, the at least one panel corresponding to the shape and contour of the vehicle surface; and removing the plastic sheeting from the at least one panel.

2. A protective panel for a vehicle surface having a shape and a contour that extends in a first, a second, and a third dimension, the panel manufactured according to the method of:
- affixing plastic sheeting to the vehicle surface;
- magnetically coupling at least one magnetic strip to the vehicle surface over the plastic sheeting;
- spraying a mixture of thermoplastic polyurethane and polyurea on the plastic sheeting over and at least partially around the at least one magnetic strip so as to embed the at least one magnetic strip at least partially within the mixture;
- drying the mixture into a body with the at least one magnetic strip at least partially embedded therein;
- cutting at least one panel from the body, the at least one panel corresponding to the shape and contour of the vehicle surface; and
- removing the plastic sheeting from the at least one panel.

3. A protective panel for a vehicle surface having a shape and a contour that extends in a first, a second, and a third dimension, the panel manufactured according to the method of:
- affixing plastic sheeting to the vehicle surface;
- magnetically coupling at least one magnet to the vehicle surface over the plastic sheeting;
- spraying a mixture of thermoplastic polyurethane and polyuria on the plastic sheeting over and at least partially around the at least one magnet so as to embed the at least one magnet at least partially within the mixture;
- drying the mixture in a body with the at least one magnet at least partially embedded therein;
- cutting at least one panel from the body, the at least one panel corresponding to the shape and contour of the vehicle surface; and
- removing the plastic sheeting from the at least one panel.

\* \* \* \* \*